United States Patent
Knoll et al.

(10) Patent No.: US 7,736,423 B2
(45) Date of Patent: Jun. 15, 2010

(54) AQUEOUS COMPOSITION FOR OUTDOOR PAINTS, INDOOR PAINTS, FACADE PAINTS AND ROOF PAINTS

(75) Inventors: Sven Knoll, Oberhausen (DE); Helmut Schmid, Freudenstadt (DE)

(73) Assignees: Fraunhofer-Gesellschaft zur Forderung der angewandten Forschung e.V., Munich (DE); Bioni CS GmbH, Oberhausen (DE)

( * ) Notice: Subject to any disclaimer, the term of this patent is extended or adjusted under 35 U.S.C. 154(b) by 0 days.

(21) Appl. No.: 11/996,618

(22) PCT Filed: Aug. 23, 2004

(86) PCT No.: PCT/EP2006/065575

§ 371 (c)(1), (2), (4) Date: Mar. 3, 2008

(87) PCT Pub. No.: WO2007/025914

PCT Pub. Date: Mar. 8, 2007

(65) Prior Publication Data

US 2008/0210131 A1    Sep. 4, 2008

(30) Foreign Application Priority Data

Aug. 29, 2005    (DE) .................. 10 2005 041 006

(51) Int. Cl.
*A01N 59/16* (2006.01)
*A01N 25/02* (2006.01)
*A01N 63/02* (2006.01)
*C08K 3/08* (2006.01)
*C08K 3/24* (2006.01)
*C09D 5/14* (2006.01)
*C09D 105/08* (2006.01)

(52) U.S. Cl. .............. 106/18.32; 106/15.05; 106/18.36; 106/162.2; 106/403; 424/78.09; 424/405; 424/520; 424/538; 424/618; 424/619; 514/55; 524/10; 524/27; 524/403; 524/440

(58) Field of Classification Search .............. 106/15.05, 106/18.36, 18.32, 162.2, 403; 424/618, 629, 424/78.09, 405, 520, 538, 619; 514/55; 524/10, 524/27, 403, 440
See application file for complete search history.

(56) References Cited

U.S. PATENT DOCUMENTS

| 2,883,307 | A  | * | 4/1959  | Orr, Jr. .................... 427/122 |
| 6,159,276 | A  | * | 12/2000 | Barks ........................ 106/33 |
| 6,331,357 | B1 | * | 12/2001 | Hasegawa et al. ........... 428/446 |
| 6,589,661 | B2 | * | 7/2003  | Neely, Jr. ................... 428/457 |
| 2005/0008861 | A1 | * | 1/2005 | Yadav et al. ................ 428/403 |
| 2005/0182152 | A1 |   | 8/2005 | Nonninger et al. |

FOREIGN PATENT DOCUMENTS

| JP | 56-29693 A   | * | 3/1981 |
| JP | 10-101964 A  | * | 4/1998 |
| JP | 2004-207558 A| * | 7/2004 |
| WO | 98/11169     |   | 3/1998 |
| WO | 00/49219     |   | 8/2000 |

OTHER PUBLICATIONS

Derwent Abstract No. 2004-600331(abstract of KR Patent Specification No. KR 2003041645A) [May 2003].*
Derwent Abstract No. 2004-621418 (abstract of KR Patent Specification No. KR 2003055197A) [Jul. 2003].*
Derwent Abstract No. 2004-696533 (abstract of KR Patent Specification No. KR 2003097386 A) [Dec. 2003].*
Derwent Abstract No. 2005-258534 (abstract of KR Patent Specification No. KR 2004095581 A) [Nov. 2004].*
Derwent Abstract No. 2006-475888 (abstract of KR Patent Specification No. KR 2005050720A) [Jun. 2005].*
International Search Report for PCT/EP2006/065575 mailed Nov. 22, 2006, two pages.

* cited by examiner

*Primary Examiner*—Anthony J Green
(74) *Attorney, Agent, or Firm*—Rankin, Hill & Clark LLP

(57) ABSTRACT

The present invention relates to an aqueous composition for outdoor, indoor, facade and roof paints having a biocidal action.

19 Claims, 1 Drawing Sheet

AQUEOUS COMPOSITION FOR OUTDOOR PAINTS, INDOOR PAINTS, FACADE PAINTS AND ROOF PAINTS

BACKGROUND OF THE INVENTION

1. Field of the Invention

The present invention relates to an aqueous composition for outdoor, indoor, facade and roof paints having a biocidal action.

2. Description of Related Art

Today, dispersion paints are used as a composition for outdoor, indoor, facade and roof paints, in particular in the construction industry. When used, in particular, in areas of high humidity, such as, for example, in damp rooms, for example in the food and textile industry, in swimming baths, kitchens, bathrooms and cellars, but also in living spaces, sleeping spaces and offices, and if organic components are present at the same time, there is a danger of the formation of mould. There is also an increased risk of mould fungus formation in areas of missing or insufficient insulation of the external walls and/or of thermal bridges or thermal weak spots in the external envelope. In practice, the areas of facades and roofs can often be found to be affected on the surfaces with algae, lichens, as well as fungi. In the state of the art, biocidal additives are used in compositions for indoor, facade and roof paints, the biocidal additives at the same time acting as film and pot preservatives, which, however, have the disadvantage of being toxic, which is why the use of these substances is subject to legal regulations as regards to type and quantity. In addition, these substances have a period of action that is very limited with regard to its duration, due to their volatility and their lack of chemical long-term stability. Thus, isothiazolinones are often used as preservatives in dispersion paints. However, it is known that compounds such as 5-chloro-2-methyl-2,3-dihydroisothiazole-3-one (MCI) and 2-methyl-2,3-dihydroisothiazole-3-one (MI) have an allergenic potential or are toxic.

BRIEF SUMMARY OF THE INVENTION

The inventors of the present invention therefore addressed the object of providing an aqueous composition for outdoor paints, indoor paints, facade paints and roof paints, in particular a dispersion paint having a strong biocidal action, and thus, an extremely low susceptibility with regard to the colonization by microorganisms. In addition, they found that the biocidally active ingredients did not discolour the paint, that they are compatible with the paint components, non-volatile, odourless, and, in particular, non-toxic and permanently effective.

Even though the biocidal action of silver has been known since mediaeval times, and though use is made of this action in certain applications even today, the possibility of the use of elementary silver in liquid, aqueous paint compositions for indoor, facade and roof paints is not made obvious or even mentioned in any of the documents relating to these applications.

Some of the documents found in a search in this regard are listed below, which describe the applications of elementary silver as an antimicrobial or antifungal agent.

Thus, WO 03/080911 discloses a fibre-like material comprising a nano-silver coating having nano-silver particles with diameters of less than 100 nm. The production of this fibre-like material is carried out by immersing degreased yarns in nano-silver solutions. From WO 2004/059027, a method for depositing an antimicrobial surface onto substrates is known, wherein antimicrobial metals are applied onto substrates by plasma deposition. Anti-microbial powder coating compositions are known from US 2004/0180098, US 2003/0096017. From EP-A-1433871, a method is known for providing anti-bacterial activity on a surface of a body using nanoparticular metals. Anti-microbial adhesive and coating substances are known from WO 03/024494. These, however, are purely organic compositions, which are not expected to have activity in aqueous compositions, and that, furthermore, would not comply with today's ecological requirements.

Thus, none of the above-mentioned documents discloses the application of silver or silver ions as biocidal agent in aqueous paint compositions for outdoor, indoor, facade and/or roof paints, in particular aqueous dispersion paints, or makes this application obvious.

DETAILED DESCRIPTION OF THE INVENTION

Figure 1:
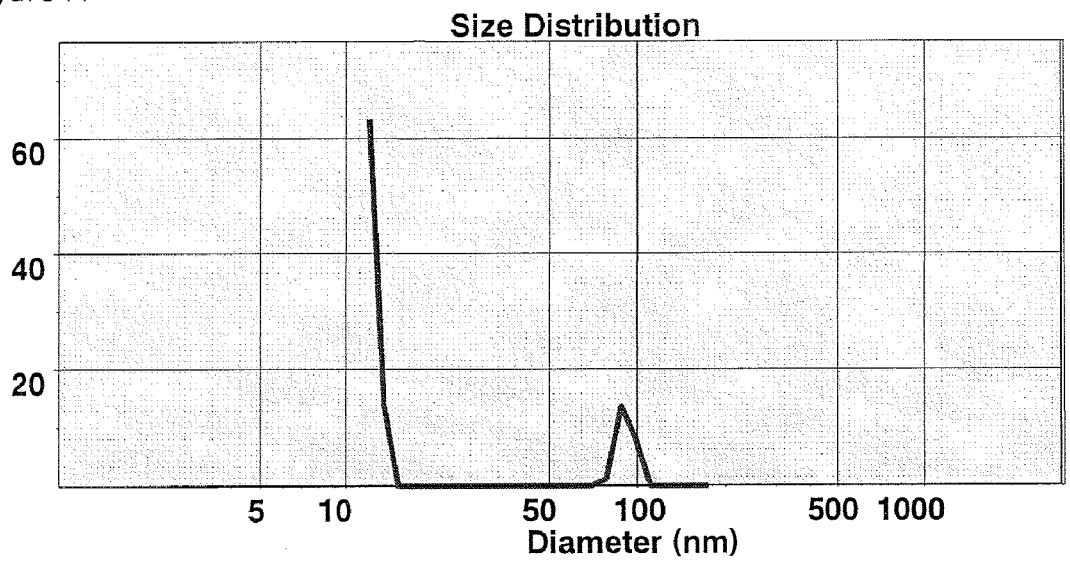
FIG. 1 depicts a PCS analysis of a nano-Ag suspension (1% by vol in $H_2O$) according to the invention.

The present inventors surprisingly found that silver displays a biocidal action under the special conditions of aqueous paint compositions for outdoor, indoor, facade and/or roof paints. The inventors further found that a particularly pronounced biocidal action is achieved if the aqueous paint composition according to the invention contains silver in a nanoparticular form. An even more pronounced biocidal action can be achieved if silver in the form of a soluble silver salt, such as, in particular, silver nitrate, is added to the aqueous paint composition, apart from nanoparticular elementary silver. For a given binding agent system, the bioavailability of the silver ions, and thus, the biocidal action of the paint agent, can here be adjusted in a customized manner as a function of time, via the proportion of elementary silver to soluble silver salt. Particularly surprisingly, the present inventors found that a synergetic increase of the biocidal action is achieved by the addition of chitosan to the paint composition according to the invention. A further improvement can be achieved by the additional use of nanoparticular ZnO (zinc oxide). Preferably, the nanoparticular zinc oxide has a mean grain size of less than 500 nm, more preferably of less than 100 nm, still more preferably of less than 50 nm. The particle size range of between 5 to 50 nm is particularly active. The particle size is determined by photon correlation spectroscopy. If the composition contains nanoparticular zinc oxide, it is expediently present in an amount of 0.000001 to 25% by mass, relative to the total mass of the composition.

Thus, the inventors were successful in providing an aqueous paint composition that is highly compatible with regard to ecology and health, which contains non-volatile anti-microbial agents and therefore exhibits no allergenic or toxic actions.

Therefore, the subject matter of the present invention are aqueous compositions for indoor, outdoor, facade and/or roof paints containing silver. Aqueous compositions for outdoor, indoor, facade and roof paints within the sense of the invention are water-based coating agents, in particular aqueous plastic dispersion paints containing at least, in particular, one water-dispersible organic and/or inorganic binding agent dispersed therein. They are preferably used when interior spaces, facade and roof surfaces are being painted the first time or repainted. Their application is carried out, in particular, by rolling or brushing, also by spraying in the case of systems with low viscosity. In any case, the composition according to the invention is liquid or brushable at room temperature (20° C.).

The paint composition according to the invention contains silver. Particularly preferably, the paint composition according to the invention contains silver in nanoparticular form, that is, the particles of the elementary silver have a mean particle size (diameter) of less than 500 nm, more preferably of less than 100 nm, still more preferably of less than 50 nm. A mean particle size of 5 to 50 nm is particularly active. The particle size here is determined by photon correlation spectroscopy.

Due to the use of the nanoparticular silver in the compositions according to the invention, an unexpectedly high biocidal action is achieved in a sustained manner, relative to the silver content, so that the quantity of the silver used can remain small.

In contrast to the organic biocidal active substances hitherto used in paint systems, the nanoparticular silver used in accordance with the invention has a high chemical long-term stability. Since paints often remain applied over many years, and as outdoor paints, especially, are exposed to strong meteorological influences, such as rain and insolation, the use according to the invention of the stable nanoparticular silver constitutes a substantial improvement in providing biocidally equipped aqueous paint systems, in particular with regard to the long-term action.

Mechanistically seen, a thin, not completely closed oxide layer having $Ag_2O$ as a main component forms on the nanosilver particles. Solvolysis leads to the formation of $Ag^+$ cations, which, as the actual active component, block the thio enzymes of the microorganisms.

The content in the paint composition according to the invention of elementary, in particular nanoparticular silver, preferably is less than about 500 ppm, preferably less than about 100 ppm. Particularly preferably, the nanoparticular silver is present in an amount of 1 to 100 ppm, more preferably of 1 to 10 ppm, relative to the total mass of the paint composition.

Furthermore, the inventors surprisingly found that the addition of silver ions by adding preferably soluble silver salts, such as, in particular silver nitrate, combined with the nanoparticular silver causes a synergetic effect with regard to the biocidal action relative to the total quantity of the silver used.

As was already mentioned, it is furthermore possible to adjust in a customized manner the bioavailability of the silver ions as a function of time by adjusting the proportion of nanoparticular silver to soluble silver salt for a given binding agent.

The quantity of the soluble silver salt used, relative to the total mass of the paint composition, preferably is less than about 500 ppm, preferably less than about 100 ppm. Particularly preferably, the quantity of the silver salt silver is 1 to 100 ppm, more preferably 1 to 10 ppm, relative to the total mass of the paint composition.

Furthermore, the present inventors were successful, surprisingly, in increasing the biocidal action of the paint composition according to the invention in a synergetic manner by adding chitosan (trade name for the deacylated chitin (CAS 9012-6-4. C.—see Fiedler, Lexikon der Hilfsstoffe, Editio Cantor Verlag, 5th edition, 2002)) and/or a chitosan derivative, so that there is the possibility of further reducing the quantity of silver used. Chitosan that can be used in the invention has, for example, a molecular weight of 3,000 to 700,000, and is commercially available (see, for example, EP-A-0 377 091). The synergistic mode of action of the chitosan in cooperation with the silver used is based on the biocidal growth taking place in accordance with different mechanisms, with biochemical processes also being of significance in building up the cell walls of the bacteria or fungi. Chitosan interferes with the metabolism for building up the chitin cell walls and thus inhibits cell growth. It was surprising that chitosan had this action also under the special chemical conditions of aqueous paint systems.

The use of the combination of active substances of silver, in particular nanoparticular silver, in particular combined with silver salts, and chitosan furthermore makes an additional degree of freedom available for the adjustment of the bioavailability and leaching rate of the silver as a function of the concrete requirement profile and the concrete paint system. According to the invention, chitosan, in case of its use, is preferably used in an amount of about 0.1 to 10% by mass, preferably of less than about 5 percent by mass, still more preferred less than 1% by mass, in each case relative to the total mass of the composition. The minimum quantity used of the chitosan, in case of its use, is at least about 0.1% by mass (mass percent), in each case relative to the total mass of the composition.

According to the invention, the use of chitosan derivatives is also possible, e.g. N,O-carboxymethyl chitosan, chitosan hydrochloride, chitosan acetate and chitosan lactate. In addition to the biocidal action, the absorber action due to the secondary or tertiary structure of the molecular chain must be emphasized. One or more chitosan derivatives can be used in combination. Furthermore, one or more chitosan derivatives can be used also in combination with chitosan. Since the chitosan derivatives, both amongst themselves as well as compared to chitosan, differ in particular with regard to their solubility in water, further possibilities of specifically adjusting the bioavailability, and thus, the biocidal action (biocidal action spectrum and action period).

The paint composition according to the invention preferably contains at least one, in particular water dispersible, binding agent, in particular at least one inorganic and/or organic binding agent.

Organic binding agents are, for example, selected from the group consisting of vinyl-containing, such as styrene-containing, acrylate-containing and vinyl acetate-containing, urethane-containing, ester-containing, polymers or copolymers thereof, silicone resins and epoxy resins. Preferred organic binding agents are acrylic resins. In order to be water-dispersible, they generally have in particular ionic groups, such as, for example, ammonium chloride. According to the invention, one or more binding agents can be used in combination with each other.

The organic binding agents are expediently contained in the compositions according to the invention in quantities of up to 60% by mass. The minimum quantity of the organic binding agents expediently is about 5% by mass, relative to the total quantity of the composition. Preferably, the compositions according to the invention contain about 10 to 40% by mass of the organic binding agent.

The inorganic binding agents are, for example, selected from lime, white cement and potassium water glass, the latter being preferred. Lime is used, for example, in the form of calcium hydroxide, as pit lime etc, white cement is used in powder form, and potassium water glass as an aqueous solution of potassium silicate (fixative) as binding agent for so-called silicate paints. The quantity of the inorganic binding agent expediently is maximally about 30% by mass, expediently at least about 1% by mass, relative to the total quantity of the composition.

Inorganic and organic binding agents can also be used in combination. Organic binding agents are preferably used without inorganic binding agents. Inorganic binding agents are preferably used in combination with organic binding agents.

The composition according to the invention is an aqueous composition. It therefore preferably contains at least 10, more preferably at least 20, still more preferably at least 30% by mass of water. It can additionally also contain organic solvents. The quantity of the organic solvent, however, preferably is less than about 20% by mass, more preferably less than 10% by mass, still more preferably less than about 5% by mass.

The composition according to the invention preferably is a so-called plastic dispersion paint, which, according to DIN EN 971-1: 1996-09, is a coating substance in which an organic binding agent dispersed in water is present. With regard to their degree of gloss, they are available from matte to glossy, and are particularly used when interior spaces, facade and roof surfaces are being painted the first time or repainted, the application preferably being carried out by rolling or brushing.

Furthermore, the paint compositions according to the invention expediently contain about up to 50% by mass colouring agents, such as pigments and dyes. Examples for pigments are titanium dioxide, iron oxide, magnesium oxide, zinc chromate, carbon black, barium sulphate. Dyes include, for example, para red, thioindigo, antrachinon, phthalocyanine blue and azo dyes.

In addition, typical inorganic or organic filler, such as carbonates, e.g., calcium carbonate; sulphates, e.g. calcium sulphate; silicates, e.g. talc, quartz; silicic acid, e.g. glass spheres, glass fibres; hollow microspheres; organic fillers, e.g. organic hollow microspheres, polymer fibres, cellulose fibres, can be used.

In addition, typical additives can be used, such as processing aids, such as dispersion aids, thickening agents, defoamer, stabilizers, cross-linking agents, etc.

The compositions according to the invention are capable, in particular, of inhibiting, controlling or eliminating the growth of bacteria, fungi, but also, surprisingly, the growth of algae, mosses and lichens, depending on the concentration of the biocidally active components. The activity against lichens and mosses is particularly useful in the case of roof paints because, as is known, roofs can already be overgrown after a few years which leads to considerable adverse effects with regards to aesthetic appearance, but also with respect to function.

In particular the composition according to the invention is capable of inhibiting or stopping the growth of bacteria, such as Gram-positive bacteria and Gram-negative bacteria, such as, for example, of *Chlamydia trachomatis, Citrobacter, Providencia stuartii, Vibrio vulnificus, Staphylococcus aureas, Staphyloccus epidermidus, Escheria coli, Pseudomonas maltophilia, Serratia marcesens, Bacillus subtilis, Bacillus cloacae, Bacillus allantoides, Bacillus foecalis* alkaligenes, Pneumobacillus, nitrate-negative *Bacillus, Streptococcus* facades, *Streptococcus hemolyticus* B, *Salmonella typhinurium, Salmonella paratyphi* C, *Salmonella morgani, Pseudomonas aeruginosa*. Furthermore, the composition according to the invention is also capable of inhibiting the growth of certain higher organisms, such as algae, fungi (*Aspergillus*, in particular *Aspergillus niger, Aureobasidium, Botrytis, Candida albicans, Ceratostomella, Chaetomium, Cuvularla, Fusarlum, Gliocladium virens* and *Penicillium* species), yeasts and spores.

The production of the aqueous composition according to the invention is carried out, in particular, by producing a commonly used plastic dispersion paint to which the nanoparticular silver is added in the form of a suspension. Nanoparticular silver suspensions are known from the prior art and can be obtained commercially. FIG. 1, for example, shows the result of a PCS analysis of a nano-Ag suspension (1% by vol in $H_2O$) that is applicable according to the invention.

In a preferred embodiment, silver nitrate is added to the paint compositions according to the invention simultaneously. In another preferred embodiment, chitosan or chitosan derivatives are added in the quantities specified above.

In practical application, the combination of the biocidal active substances is provided in the form of an aqueous suspension for incorporation into a paint.

The aqueous paint compositions according to the invention can be used, in particular, in damp areas, such as swimming baths etc. In particular, application takes place in damp spaces in which the formation of mould is to be suppressed, such as, for example, in hospital areas, or in areas for foodstuff production, where biocidal surfaces are required, that is, generally in areas in which special hygienic requirements must be made.

The aqueous paint composition according to the invention can, in particular, be applied onto existing paints, wallpaper, old and new plasters, plasterboards, etc., as an indoor paint composition.

The aqueous paint composition according to the invention can, in particular, be applied onto existing paints, old and new plasters, sandy limestone, brickwork, boards of fibrated cement, metal such as corrugated sheet metal, etc., as an outdoor paint composition.

The aqueous paint composition according to the invention can, in particular, be applied onto concrete roofing tiles, corrugated metal, clay bricks, (artificial) slates, roofing tiles and panels containing fibrated cement, etc., as a roof paint composition.

The invention is explained in more detail by means of the following exemplary embodiment.

The following mixture was prepared:

100 ppm nanoparticular silver having the grain size distribution shown in FIG. 1, 100 ppm silver nitrate (relative to the quantity of silver) and 1% by mass of chitosan were added to a commercial aqueous dispersion paint (BIO00101 by the company Bioni-Shield, Oberhausen) and was worked in homogeneously (depending on a lesser degree of danger with regard to microbial contaminations, smaller contents of the biocidally active additives can be used).

Figure 2:
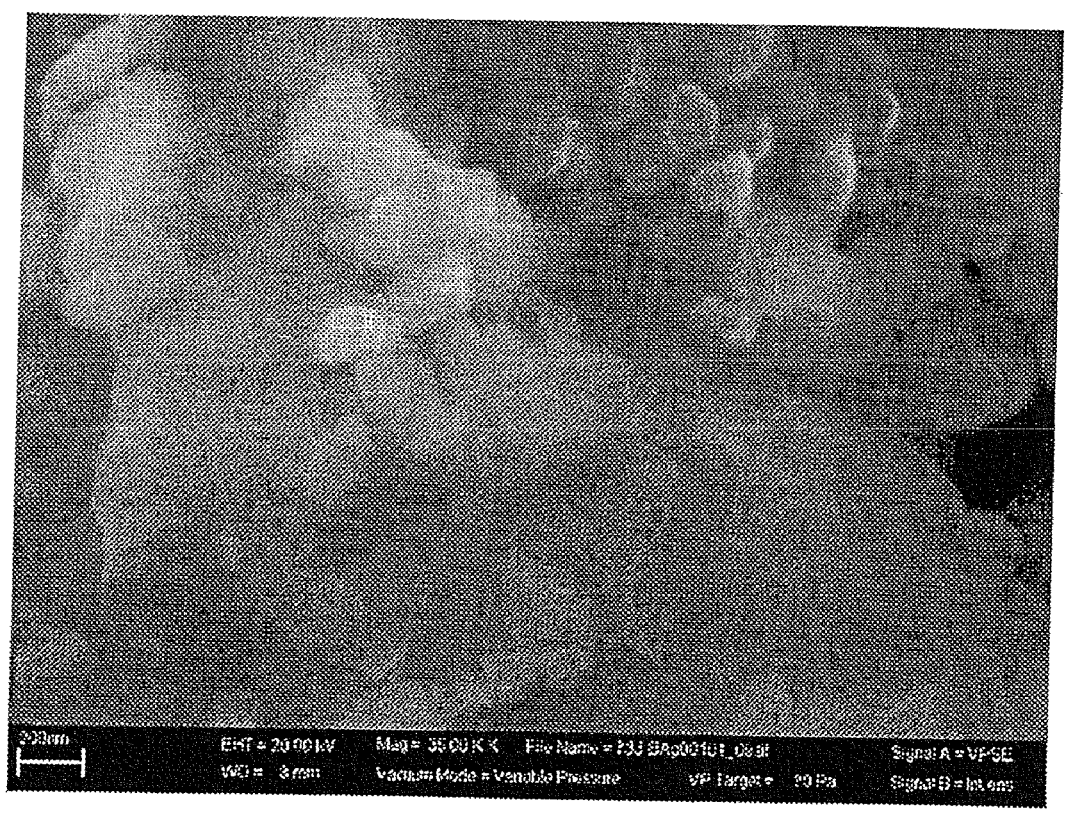
FIG. 2 shows a REM (reflecting electron microscope) image of the sample produced in the exemplary embodiment.

FIG. 2 shows a REM image of the produced sample. Particles with a grain size of about 200 nm, which are interpreted as pigments, can be recognized. Particles <15 nm that occur sporadically due to the low concentration are interpreted as nanoparticular silver.

Using the above produced paint, its biocidal activity was demonstrated in a suspension test following the preconditions given by Pharm. EU., 1997, supplement 2001, 2.6 "Methods of Biology", 2.6.1 "Sterility test", SOP Suitability test for nutrient media in accordance with the method of direct coating. The microorganism used was the fungus *Aspergillus niger*.

The direct smears with an inoculating loop according to the above described method showed no fungal growth at all for the paint composition according to the invention.

The invention claimed is:

1. An aqueous paint composition comprising
   (a) elementary silver,
   (b) one selected from the group consisting of chitosan, chitosan derivatives, and combinations thereof
   (c) wherein the total weight of chitosan and chitosan derivatives constitutes 0.1 to 10% by mass of the aqueous paint composition.

2. The paint composition of claim 1, wherein the silver is present in the form of particles.

3. The paint composition of claim 1, wherein the silver is present in the form of particles having an average particle size of less than 500 nm.

4. The paint composition of claim 1, wherein the concentration of the elementary silver is no greater than 500 ppm.

5. The paint composition of claim 1, comprising chitosan derivatives, wherein the chitosan derivatives are selected from the group consisting of N,O-carboxymethyl chitosan, chitosan hydrochloride, chitosan acetate and chitosan lactate.

6. The paint composition of claim 1, further comprising ZnO having a mean particle size of less than 500 nm.

7. The paint composition of claim 1, comprising at least one binding agent.

8. The paint composition of claim 7, wherein the binding agent is organic or inorganic.

9. The paint composition of claim 8, wherein the at least one organic or inorganic binding agent is water-dispersible.

10. The paint composition of claim 9, wherein the binding agent is an organic binding agent including a monomer selected from the group consisting of vinyl, styrene, acrylate, vinyl acetate, urethane, ester, polymers of the foregoing, copolymers of the foregoing, silicone resins, and epoxy resins.

11. A method for coating surfaces of building interiors, building exteriors, building facades and roofs, comprising applying to a surface thereof the aqueous composition of claim 1.

12. An aqueous paint composition comprising:
    (a) elementary silver,
    (b) silver salt and
    (c) one selected from the group consisting of chitosan, chitosan derivatives, and combinations thereof.

13. The paint composition of claim 12, further comprising ZnO having a mean particle size of less than 500 nm.

14. The paint composition of claim 12, further comprising at least one binding agent.

15. A method for coating surfaces of building interiors, building exteriors, building facades and roofs, comprising applying to a surface thereof the aqueous composition of claim 12.

16. A method of painting a surface comprising applying to the surface an aqueous composition including nanoparticulate silver and at least one selected from the group consisting of chitosan, chitosan derivatives, nanoparticulate ZnO, and combinations thereof, wherein the aqueous composition comprises one selected from the group consisting of a biocide and a binding agent.

17. A method for coating surfaces of building interiors, building exteriors, building facades and roofs, comprising applying to a surface thereof the aqueous composition of claim 16.

18. A method of painting a surface comprising applying to the surface an aqueous composition including nanoparticulate silver and at least one selected from the group consisting of chitosan, chitosan derivatives, nanoparticulate ZnO, and combinations thereof, wherein the aqueous composition further comprises a binding agent and a dispersing agent.

19. A method for coating surfaces of building interiors, building exteriors, building facades and roofs, comprising applying to a surface thereof the aqueous composition of claim 18.

* * * * *

UNITED STATES PATENT AND TRADEMARK OFFICE
CERTIFICATE OF CORRECTION

| | | |
|---|---|---|
| PATENT NO. | : 7,736,423 B2 | Page 1 of 1 |
| APPLICATION NO. | : 11/996618 | |
| DATED | : June 15, 2010 | |
| INVENTOR(S) | : Sven Knoll et al. | |

It is certified that error appears in the above-identified patent and that said Letters Patent is hereby corrected as shown below:

On the Title Page, Item (22), delete "August 23, 2004", and insert -- August 23, 2006 --

Signed and Sealed this
Fifth Day of August, 2014

Michelle K. Lee
*Deputy Director of the United States Patent and Trademark Office*